July 29, 1930.  W. W. LA RUE  1,771,495

PEEL DUSTER

Original Filed Oct. 15, 1928   2 Sheets-Sheet 1

Inventor:
Walter W. La Rue,
by Rippey & Kingsland
His Attorneys

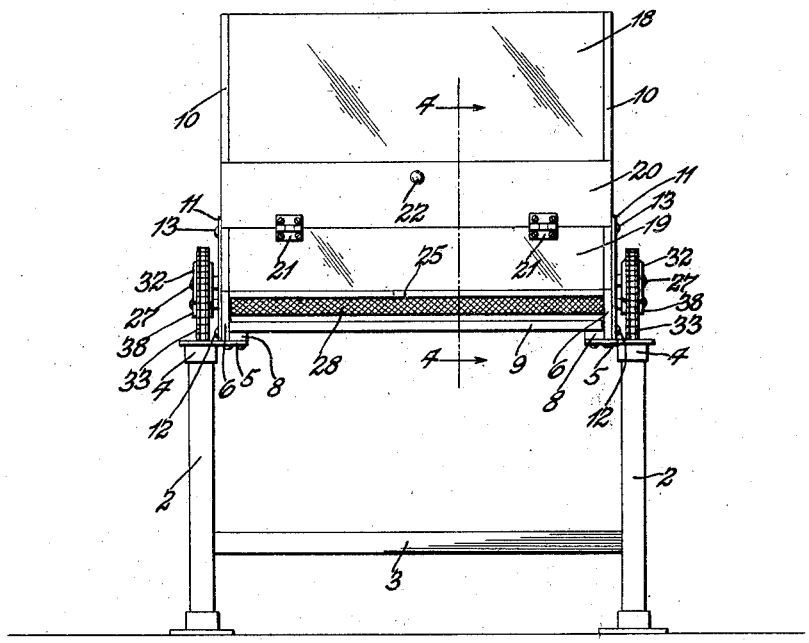

Patented July 29, 1930

1,771,495

UNITED STATES PATENT OFFICE

WALTER W. LA RUE, OF MINNEAPOLIS, MINNESOTA

PEEL DUSTER

Application filed October 15, 1928, Serial No. 312,514. Renewed May 17, 1930.

This invention relates to peel dusters, which are machines used extensively in bakeries and the like for sifting or dusting a layer of meal upon a board or plate.

An object of the invention is to provide a peel duster, a machine for use in sifting a layer of meal or the like upon a board or plate, comprising a hopper for containing the meal to be sifted and provided with a sieve at its lower discharge end, in combination with means for agitating the meal adjacent to the sieve automatically and as an incident to the insertion and withdrawal of the peel, which is the board or plate upon which the layer of meal or the like is dusted.

Other objects of the invention will appear from the following description, reference being made to the accompanying drawings in which Fig. 1 is a plan view of my improved machine.

Fig. 3 is a front elevation.

Fig. 4 is an enlarged vertical sectional view of the hopper and sieve approximately on the line 4—4 of Fig. 3.

Fig. 5 is a vertical sectional view approximately on the line 5—5 of Fig. 2.

Figure 1:
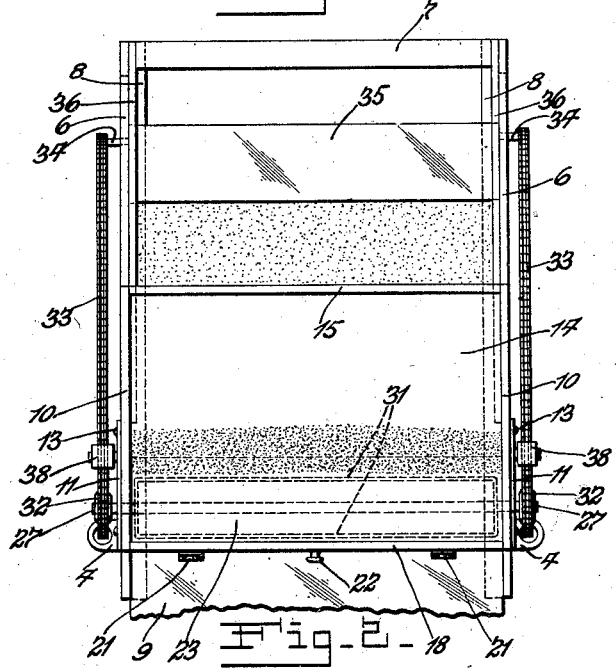

In the embodiment shown in the drawings my improved peel duster comprises a supporting frame including rear legs 1 and tubular front legs 2, the several legs being at the corners and joined by strengthening bars 3. A fitting 4 is attached to the upper end of each of the tubular legs 2, and each fitting rigidly supports an inwardly extending arm 5.

A top frame for the machine is mounted upon this supporting frame and comprises two parallel side members 6 having their lower edges seated upon the arms 5 at the front of the machine, and having their rear ends attached to a frame cross member 7 rigid with the upper ends of the legs 1. A pair of guide strips 8 are provided. One of said guide strips 8 is located at the inner side of the lower edge of each of the frame side members 6. The guide strips 8 have their front ends on and attached to the arms 5 and their rear ends rigidly supported along the inner sides of the frame side members 6. These guide strips 8 are horizontal and are parallel with each other, and constitute a support for the peel 9 which is the board or plate upon which the layer of meal or the like is sifted. That is to say, the peel 9 is slidable rearwardly and forwardly upon the supporting strips 8. The peel 9 is guided horizontally by said strips 8 and is guided along its lateral edges by the frame side members 6.

The hopper for containing the meal to be sifted is supported near the front end of the machine. As shown, the hopper comprises two vertical side walls 10 extending vertically above the frame side members 6 and being rigidly attached to and supported by said side members 6 by metallic plates 11. The lower edges of the plates 11 are attached to the frame side members 6 by fasteners 12, and the upper edges of said plates are attached to the hopper side walls 10 by fasteners 13. The hopper includes a rear wall 14 which inclines upwardly and rearwardly between the similarly inclined rear edges of the hopper side walls 10. At its upper edge the inclined wall 14 is closely jointed with a relatively narrow vertical wall member 15 which extends to the upper edges of the side walls 10. The lower edge of the inclined rear wall 14 forms close joint with a relatively narrow vertical wall member 16 (Fig. 4) which extends to the lower ends of the side walls and forms close joint with a relatively narrow horizontal ledge-forming wall member 17. The ledge wall 17 extends forwardly for a short distance beyond the inner surface of the wall member 16. The front of the hopper comprises a vertical upper wall portion 18, a vertical lower wall 19 spaced from the lower edge of the wall 18, and a door 20 secured to the upper edge of the lower wall member 19 by hinges 21 and being of a width sufficient to close the opening between the lower edge of the wall member 18 and the upper edge of the wall member 19. A latch 22 is pivoted to the upper edge of the door 20. This latch is of known and conventional construction and is operative to position to engage the inner side of the lower edge of the wall member 18 to hold the door closed; and may also be released to permit the door to be opened to afford access to the inside of the lower portion of the hopper. From the lower edge of the wall member 18 a shelf 23 inclines downwardly and rearwardly toward the lower portion of the inclined wall 14. The rear lower edge of the shelf 23 is spaced from the wall 14, leaving a passage 24 which extends the full width of the hopper between the walls 10, so as to permit the meal to flow through said narrow passage to the sifting device. From the lower edge of the wall member 19 a ledge strip 25 extends toward the ledge strip 17 and in the same horizontal plane. The ledge strip 25 extends slightly beyond the inner edge of the member 19.

Below the lower ends of the hopper side walls 10 the frame side members 6 have recesses 26 (Fig. 5) formed therein, and the lower walls of said recesses are curved approximately concentrically with the axis of a shaft 27. A screen 28 is curved approximately concentrically with the axis of the shaft 27 and has its ends within the recesses 26 upon the curved lower walls of said recesses and is clamped therein by plates 29 detachably secured to the frame side members 6 by screws 30. The upper rear and front edges of the screen 28 overlap and are attached to the upper sides of the ledge strips 17 and 25, respectively. The lower portion of the screen 28 is above the supporting guide strips 8 a sufficient distance to permit the peel 9 to move freely and to receive the layer of meal sifted through the sieve.

The shaft 27 is journaled for rotation in the lower portions of the hopper side walls and projects through and beyond the plates 11. A pair of bails 31 are attached to the shaft 27. These bails may be formed, as shown, by bending a stiff wire into approximately rectangular form and having the ends of the rectangular device formed by the wire extended through holes in the shaft 27, as will be readily understood by reference to Figs. 4 and 5.

To each end of the shaft 27 a sprocket wheel 32 is attached. A chain 33 is engaged over each of the sprocket wheels 32. The rear ends of said chains 33 are attached to projections 34 from a slide 35 that is mounted upon the guide strips 8 between the frame side members 6 and below upper guide members 36. The projections 34 extend through slots 37 in the frame side members 6, and extent of forward movement of the slide 35 is limited by the length of the slots 37. The chains 33 pass under idle rollers 38 supported by the plates 11. The front ends of the chain 33 extend downwardly into the tubular legs 2 and are attached to weights 39 which operate freely in said legs.

Figure 2:
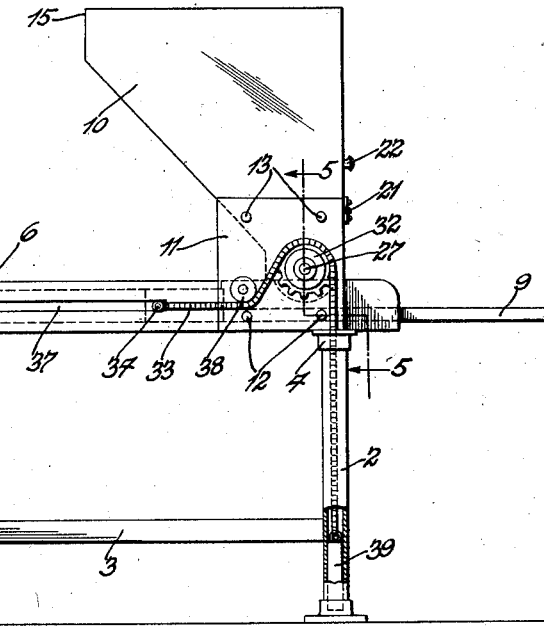
Fig. 2 is a side elevation.

In operation a desired amount of meal is placed in the hopper and will flow through the passage 24 onto the screen 28, but will not completely fill the space below the shelf 23. The shelf 23 is provided so as to prevent the shaft 27 and the bails 31 from being completely imbedded in the meal, with the result that said shaft and bails may be freely operated to agitate the meal. When the peel 9 is removed from the machine, the slide 35 is retained in its foremost position (Fig. 2) by the weights 39. When the peel is inserted into the machine upon the guide strips 8 the rear edge of the peel engages the front edge of the slide 35; and, as the peel is pushed rearwardly and inwardly into the machine, the slide 35 is forced rearwardly causing the chains to rotate the wheels 32 and thereby the shaft 27 and the bails 31. The bails are thereby caused to agitate the meal and to sift or dust the meal through the screen 28 on to the peel 9. After the peel 9 has been pushed the required distance into the machine it is withdrawn and, as an incident to such withdrawal, the weights 39 operate the chains 33 to rotate the bails 31 in the opposite direction, sifting meal onto the peel. The arrangement is such that a layer of meal of sufficient thickness is dusted onto the peel automatically and as an incident to the insertion and withdrawal of the peel 9.

The construction and arrangement may be varied within equivalent limits without departure from the nature and principle of the invention.

I claim:

1. A machine of the character described comprising a hopper, a screen forming a discharge device at the lower end of the hopper, an inclined shelf in the hopper controlling the passage of the contents of the hopper to the screen, a shaft extending through the hopper parallel with the screen, a bail attached to the shaft, a guide for supporting and guiding a peel below the screen, means adapted to be operated by the peel moving in one direction to rotate said shaft and thereby said bail, and means operative to rotate the shaft and thereby the bail automatically and as an incident to movement of the peel in the opposite direction.

2. A machine of the character described comprising a hopper, a screen forming a discharge device at the lower end of the hopper, means for supporting and guiding a peel below the screen, an agitator device for the contents of the hopper, means for operating said agitator device by rearward movement of the peel, and means for operating the agitator device in the opposite direction automatically and as an incident to forward movement of the peel.

3. A machine of the character described comprising a hopper having an inclined wall, a screen forming a discharge device at the lower end of the hopper, an inclined shelf extending downwardly toward said inclined wall from connection with the opposite wall and having its lower edge spaced from said inclined wall and forming a restricted opening for the passage of the contents of the hopper to the screen, a shaft extending through the hopper parallel with the screen and below said inclined shell, a bail attached to the shaft within the hopper, means for supporting and guiding a peel below the screen, and means adapted to be operated by the peel moving in one direction to rotate said shaft and thereby said bail.

4. A machine of the character described comprising a hopper having an inclined wall, a screen forming a discharge device at the lower end of the hopper, an inclined shelf extending downwardly toward said inclined wall from connection with the opposite wall and having its lower edge spaced from said inclined wall and forming a restricted opening for the passage of the contents of the hopper to the screen, a shaft extending through the hopper parallel with the screen and below said inclined shelf, a bail attached to the shaft within the hopper, means for supporting and guiding a peel below the screen, means adapted to be operated by the peel moving in one direction to rotate said shaft and thereby said bail, and means operative to rotate the shaft and thereby the bail automatically and incident to movement of the peel in opposite direction.

WALTER W. LA RUE.